United States Patent
Metsugi et al.

(10) Patent No.: US 9,022,766 B2
(45) Date of Patent: May 5, 2015

(54) MOLD TEMPERATURE CONTROL DEVICE

(75) Inventors: Masaaki Metsugi, Hirakata (JP); Motoharu Shimizu, Hirakata (JP)

(73) Assignee: Kabushiki Kaisha Matsui Seisakusho, Osaka (JP)

( * ) Notice: Subject to any disclaimer, the term of this patent is extended or adjusted under 35 U.S.C. 154(b) by 64 days.

(21) Appl. No.: 13/877,830

(22) PCT Filed: Oct. 5, 2011

(86) PCT No.: PCT/JP2011/072927
§ 371 (c)(1),
(2), (4) Date: Apr. 4, 2013

(87) PCT Pub. No.: WO2012/046752
PCT Pub. Date: Apr. 12, 2012

(65) Prior Publication Data
US 2013/0196015 A1 Aug. 1, 2013

(30) Foreign Application Priority Data
Oct. 7, 2010 (JP) .................. 2010-227144

(51) Int. Cl.
*B29C 33/04* (2006.01)
*B29C 35/00* (2006.01)
B29C 49/64 (2006.01)
(Continued)

(52) U.S. Cl.
CPC .............. *B29C 35/007* (2013.01); *B29C 49/64* (2013.01); *B29C 45/78* (2013.01); *B29C 33/04* (2013.01); *B29C 45/73* (2013.01); *B29C 49/4823* (2013.01);
(Continued)

(58) Field of Classification Search
CPC ........ B29C 33/04; B29C 45/73; B29C 45/78; B29C 49/4823; B29C 49/64
USPC .......................... 425/526, 407, 143, DIG. 246
See application file for complete search history.

(56) References Cited

FOREIGN PATENT DOCUMENTS

JP H06-210636 * 8/1994 ............. B29C 33/04
JP H6-210636 A 8/1994
(Continued)

OTHER PUBLICATIONS
"Method of Manufacturing Injection Molding and Injection Mold", Hayashi et al., JP 2004-322597, published in original Japanese Nov. 18, 2004, machine translation to English Jul. 21, 4014.*
(Continued)

*Primary Examiner* — Joseph S Del Sole
*Assistant Examiner* — Lawrence D Hohenbrink, Jr.
(74) *Attorney, Agent, or Firm* — DLA Piper LLP (US)

(57) ABSTRACT

A mold temperature control device comprising a first medium supply portion for circularly supplying first medium to a medium flow path of a mold, a second medium supply portion for circularly supplying the medium flow path with second medium having temperature different from that of the first medium, and a third medium supply portion for circularly supplying third medium corresponding to the first medium to the medium flow path. The mold temperature control device further comprises a switching connection portion for switching between a medium supply path and a medium return path of each medium supply portion to connect the medium flow path, and a control portion which switches second medium supply mode circularly supplying the second medium to the medium supply path to third medium supply mode circularly supplying the third medium to the medium flow path, and to first medium supply mode supplying the first medium to the medium flow path by controlling the switching connection portion.

12 Claims, 5 Drawing Sheets

(51) Int. Cl.
*B29C 45/78* (2006.01)
*B29C 45/73* (2006.01)
*B29C 49/48* (2006.01)

(52) U.S. Cl.
CPC .......... *B29C 45/7306* (2013.01); *Y10S 425/246* (2013.01)

(56) References Cited

FOREIGN PATENT DOCUMENTS

| JP | 2003-145599 A | 5/2003 | |
| JP | 2004-322597 | * 11/2004 | ............. B29C 45/73 |
| JP | 2004-322597 A | 11/2004 | |
| JP | 2005-254573 A | 9/2005 | |
| JP | 2009-45814 A | 3/2009 | |

OTHER PUBLICATIONS

"Method and Apparatus for Producing Resin Molded Product", Yamaguchi et al., JP H06-210636, published in original Japanese Aug. 2, 1994, machine translation to English Jul. 24, 2014.*

* cited by examiner

*Fig.3a* <1st medium supply procedure>
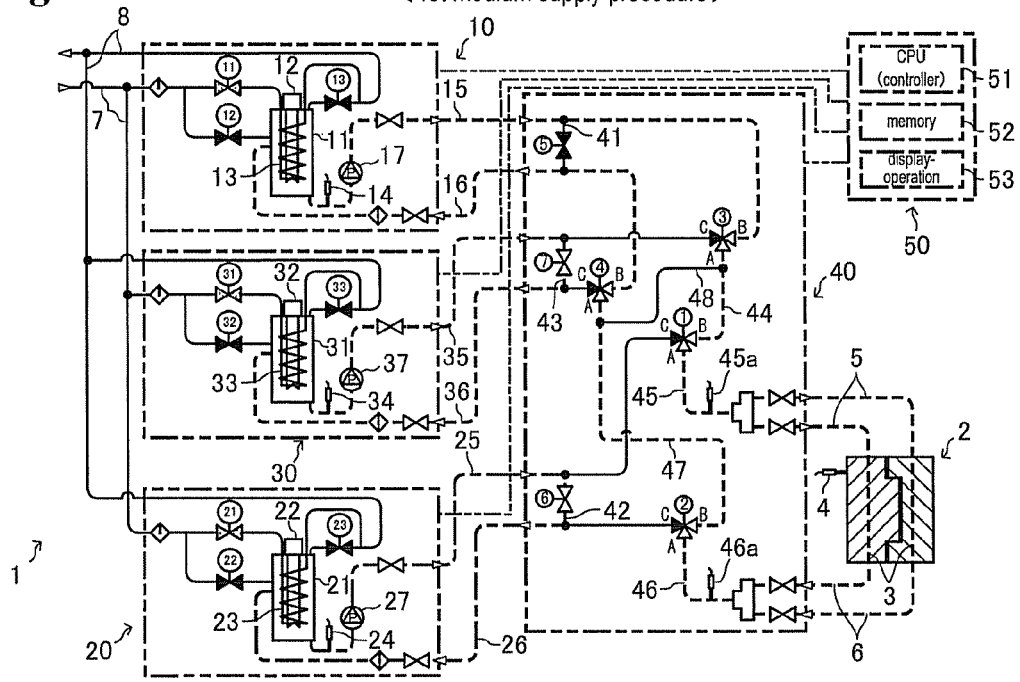
*Fig.3b* <2nd medium supply/switch procedure>
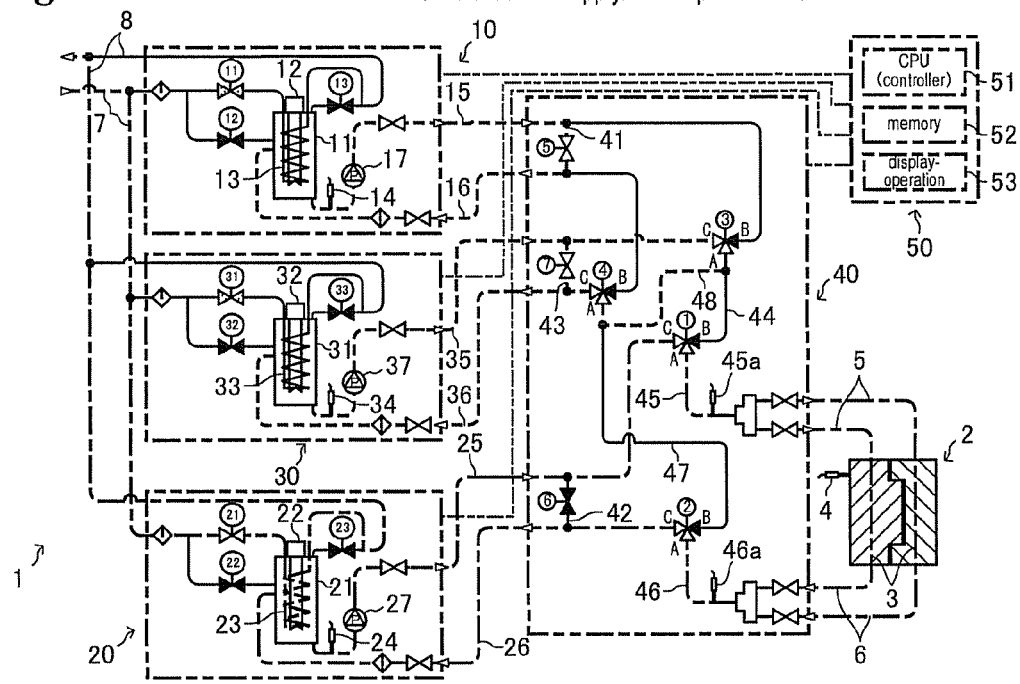

*Fig.4a* <2nd medium supply procedure>
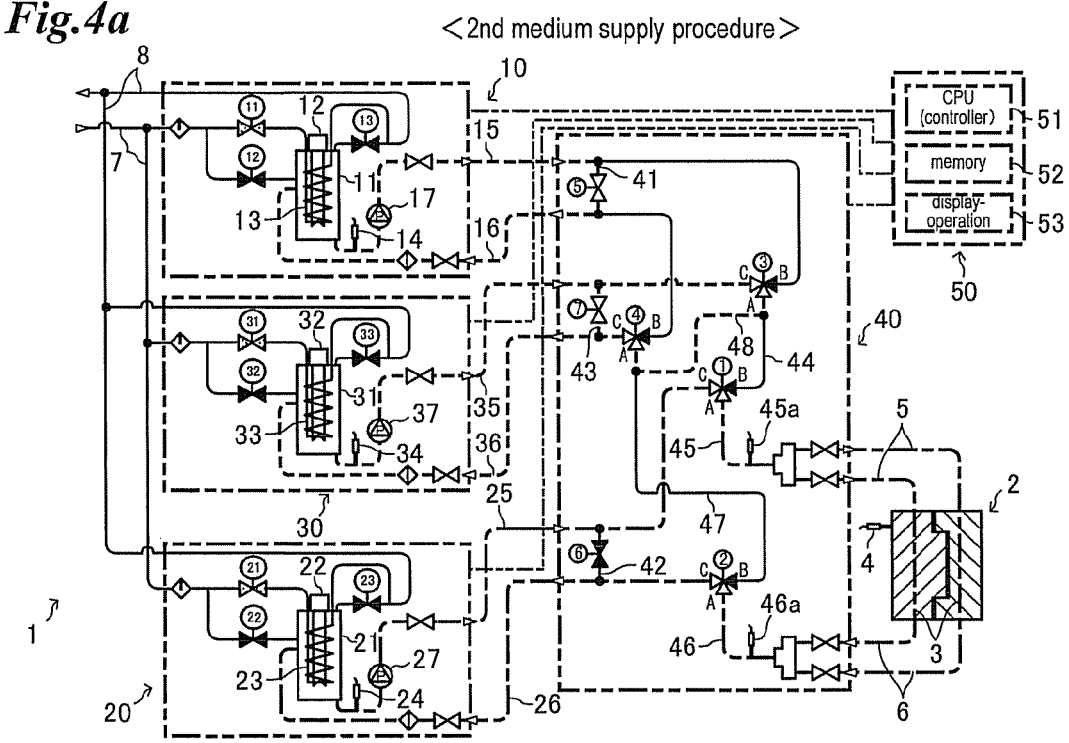
*Fig.4b* <3rd medium supply procedure>
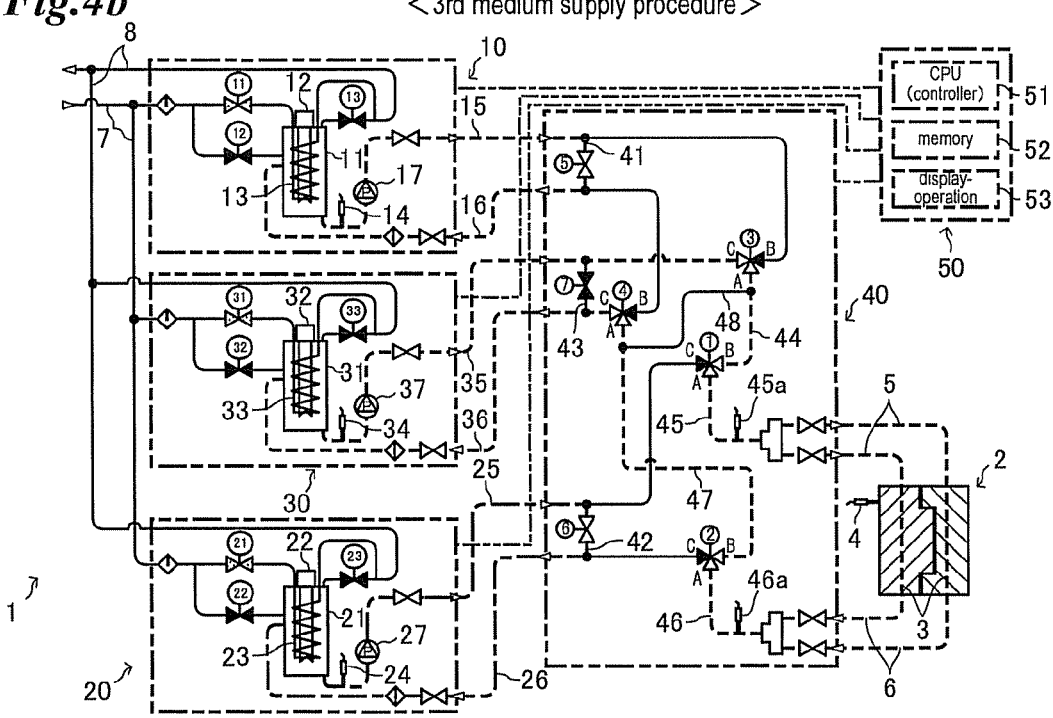

MOLD TEMPERATURE CONTROL DEVICE

TECHNICAL FIELD

The present invention relates to a mold temperature control device having a first medium supply portion for circularly supplying first medium to a medium flow path of a mold and a second medium supply portion for circularly supplying second medium having different temperature from that of the first medium to the medium flow path.

BACKGROUND ART

Conventionally proposed is a mold temperature control device (a mold temperature control system) having a high temperature medium supply portion for circularly supplying first medium, for example, high temperature medium, to a medium flow path of a mold and a low temperature medium supply portion for circularly supplying low temperature medium as the second medium having different temperature from that of first medium. Such a mold temperature control device is able to delay solidification of melted resin to be injected and charged in a mold cavity by heating the mold and to improve transcription ability (transcription rate) of the cavity surface to a molded product. In addition, melted resin is able to be swiftly solidified by cooling the mold after being charged, thereby shortening molding cycle.

In such a mold temperature control device, a mold heating mode circularly supplying high temperature medium is switched to a mold cooling mode circularly supplying low temperature medium. There has been such a problem that high temperature medium remaining in the medium flow path of the mold and in each path is returned to the low temperature medium supply portion, and the medium temperature in a storage portion of low temperature medium sharply rises. Thereby, it takes much time to drop the temperature of the medium in the low temperature medium supply portion to the predetermined temperature. In addition, when the above-mentioned mold cooling mode is switched to the above-mentioned mold heating mode, there has been such a problem that low temperature medium remaining in the medium flow path of the mold and in each path is returned to the high temperature medium supply portion, the medium temperature in a storage portion of low temperature medium sharply decreases. Thereby, it takes much time to raise the temperature of the high temperature medium supply portion to the predetermined temperature.

The Patent Literature 1 mentioned below proposes the heating/cooling device having the supply pipe line and the return pipe line connected to the heat medium path of the mold in which the cooling unit and the heating unit are connected to the supply pipe line and the return pipe line via the supply path, return path, and the circulation path, respectively. The heating/cooling device is designed such that the return pipe line is connected with the temporal water storage pipe having a pair of temporal heat medium tanks.

In the heating/cooling device, when hot water is switched to cold water, the return pipe line connected to the heat medium path of the mold is connected to the temporal storage tank, and hot water pushed out of the heat medium path of the mold by supplying cold water is supplied to the temporal storage tank. By supplying hot water, cold water previously stored in the temporal storage tank is pushed out and returned to the cold water circulation path via the cold water return path. On the other hand, when cold water is switched to hot water, the return pipe line connected to the heat medium path of the mold is connected to the temporal storage tank, and cold water pushed out of the heat medium path of the mold by supplying hot water is supplied to the temporal storage tank. By supplying cold water, hot water previously stored in the temporal storage tank is pushed out and returned to the hot water circulation path via the hot water return path.

CITATION LIST

Patent Literature

PTL 1: Japanese Patent Publication (not examined) 2003-145599-A

SUMMARY OF INVENTION

Technical Problem

In the heating/cooling device disclosed in PTL 1, hot water and cold water are designed to be alternately fed to the temporal storage tank at the time of switching, so that the waters might be mixed in the temporal storage tank when being exchanged. When each circulation path is designed to circulate hot water or cold water without being connected with the temporal storage tank, the temperature of cold water or hot water stored in the temporal storage tank might rise or drop. As a result, at the time of switching, cold water of which temperature rises might be returned from the temporal storage tank to the cold water circulation path or hot water of which temperature drops might be returned to the hot water circulation path. It takes much time for cold water or hot water to reach the preset temperature on the cold water side or the hot water side, thereby further improvement is required.

The present invention is proposed in view of the above-mentioned problems and has an object to provide a mold temperature control device capable of shortening molding cycle.

Solution to Problem

For achieving the above-mentioned object, a mold temperature control device of the present invention comprises a first medium supply portion for circularly supplying first medium to a medium flow path of a mold, a second medium supply portion for circularly supplying the medium flow path with second medium having different temperature from that of first medium, a third medium supply portion for circularly supplying third medium corresponding to the first medium to the medium flow path, a switching connection portion for switching between a medium supply path and a medium return path of each medium supply portion to connect the medium flow path, and a control portion which switches second medium supply mode circularly supplying the second medium to the medium supply path to third medium supply mode circularly supplying the third medium to the medium flow path, and to first medium supply mode supplying the first medium to the medium flow path by controlling the switching connection portion.

In the present invention as mentioned above, the second medium supply mode circularly supplying the second medium to the medium flow path is switched to the third medium supply mode circularly supplying the third medium corresponding to the first medium to the medium flow path, and then to the first medium supply mode supplying the first medium to the medium flow path. Thus, the third medium corresponding to the first medium is supplied to the medium flow path of the mold, and then the first medium is supplied. The second medium remaining in the medium flow path of the mold and so on accompanied with supply of the third medium is supplied to the third medium supply portion first, thereby reducing or preventing direct supply of the second medium to the first medium supply portion. Therefore, the third medium supply mode is switched to the first medium supply mode, reducing drop or raise of the temperature of the first medium in the first medium supply portion accompanied by supply of the second medium, and it takes less time for the first medium to reach the set temperature.

Time required for the medium of which temperature differs from the set temperature of the first medium to be supplied to the medium flow path is able to be reduced and the first medium at the preset temperature is able to be swiftly supplied to the medium flow path of the mold, thereby shortening molding cycle. The second medium remaining in the medium flow path of the mold and so on is directly supplied to the third medium supply portion, so that the temperature of the third medium differs from the set temperature. However, when the third medium supply mode is switched to the first medium supply mode and is further switched to the second medium supply mode, the temperature of the third medium is able to be surely returned to the set temperature.

The device of the present invention can be designed in such a manner that the control portion replaces at least the second medium remaining in the medium flow path and in a pipe line connecting the medium flow path and the switching connection portion (remaining second medium) with the third medium in the third medium supply mode, then the control portion switches the third medium supply mode to the first medium supply mode.

In such configuration, drop or raise of the temperature of the first medium in the first medium supply portion accompanied by supply of the second medium is able to be effectively reduced and the first medium at the preset temperature is able to be more swiftly supplied to the medium flow path of the mold.

In this case, the device can be designed such that the control portion detects that the above-mentioned remaining second medium is replaced with the third medium and switches the mode to the first medium supply mode. Such detection of the control portion can be done based on switch time which is set in advance or based on operation test, or based on detection value of detection means such as a temperature sensor, a flow meter and the like.

The device of the present invention can be designed in such a manner that the control portion switches the first medium supply mode to the second medium supply mode and forcibly operates a heat exchange means of the second medium supply portion, then the control portion controls the heat exchange means based on the temperature detected by a temperature sensor in such a manner that the second medium reaches the preset temperature.

In such configuration, in the second medium supply mode, the temperature of the second medium in the second medium supply portion drops or rises accompanied by supply of the first medium; however, the temperature of the second medium is able to be returned to the set temperature relatively soon. The conventional mold temperature control device executes temperature control, such as PID control, based on the temperature detected by a temperature sensor in order to avoid overshoot or undershoot and controls so as to reduce working rate of a heat exchange means (operation rate of a heater on high temperature side, cooling medium supply rate on low temperature side) as the medium temperature comes close to the set temperature, so that it takes relatively longer time to reach the set temperature. In the above-mentioned configuration, the heat exchange means of the second medium supply portion is forcibly operated in early time when the first medium supply mode is switched to the second medium supply mode, so that the temperature of the second medium is able to be returned to the set temperature relatively soon. Such forcible operation of the heat exchange means can be kept until the end of the preset time or can be kept until the temperature detected by the temperature sensor and the like reaches the value set in advance.

The device of the present invention can be designed in such a manner that the first medium supply portion is a high temperature medium supply portion for circularly supplying high temperature medium, and the second medium supply portion is a low temperature medium supply portion for circularly supplying low temperature medium.

In such configuration, low temperature medium (the second medium) supply mode is switched to the third medium supply mode circularly supplying the third medium corresponding to high temperature medium, and then to the high temperature medium (the first medium) supply mode, thereby reducing temperature drop of the medium in the high temperature medium supply portion and swiftly returning high temperature medium to be supplied to the medium flow path of the mold to the set temperature.

In this case, the set temperature of the third medium can be higher than the set temperature of high temperature medium (the first medium). Thereby, high temperature medium is able to be supplied to the medium flow path of the mold more rapidly and the mold is able to be rapidly heated.

The device of the present invention can be designed in such a manner that the first medium supply portion is a low temperature medium supply portion for circularly supplying low temperature medium, and the second medium supply portion is a high temperature medium supply portion for circularly supplying high temperature medium.

In such configuration, high temperature medium (the second medium) supply mode is switched to the third medium supply mode circularly supplying the third medium corresponding to low temperature medium, and then to the low temperature medium (the first medium) supply mode, thereby reducing temperature rise of the medium in the low temperature medium supply portion and swiftly returning low temperature medium to be supplied to the medium flow path of the mold to the set temperature.

In such a case, the set temperature of the third medium can be lower than the set temperature of low temperature medium (the first medium). Thereby, low temperature medium is able to be supplied to the medium flow path of the mold more rapidly and the mold is able to be rapidly cooled.

Advantageous Effects of Invention

The mold temperature control device of the present invention is characterized by the above-mentioned configuration, which shortens molding cycle.

BRIEF DESCRIPTION OF DRAWINGS

FIG. 3a is a schematic illustration explaining operation of the first medium supply process executed in the mold temperature control device of the above-mentioned example, and FIG. 3b is a schematic illustration explaining operation of the second medium supply switch process executed in the mold temperature control device of the above-mentioned example.

FIG. 4a is a schematic illustration explaining operation of the second medium supply process executed in the mold temperature control device of the above-mentioned example. FIG. 4b is a schematic illustration explaining operation of the third medium supply process executed in the mold temperature control device of the above-mentioned example.

DESCRIPTION OF EMBODIMENTS

Figure 1:
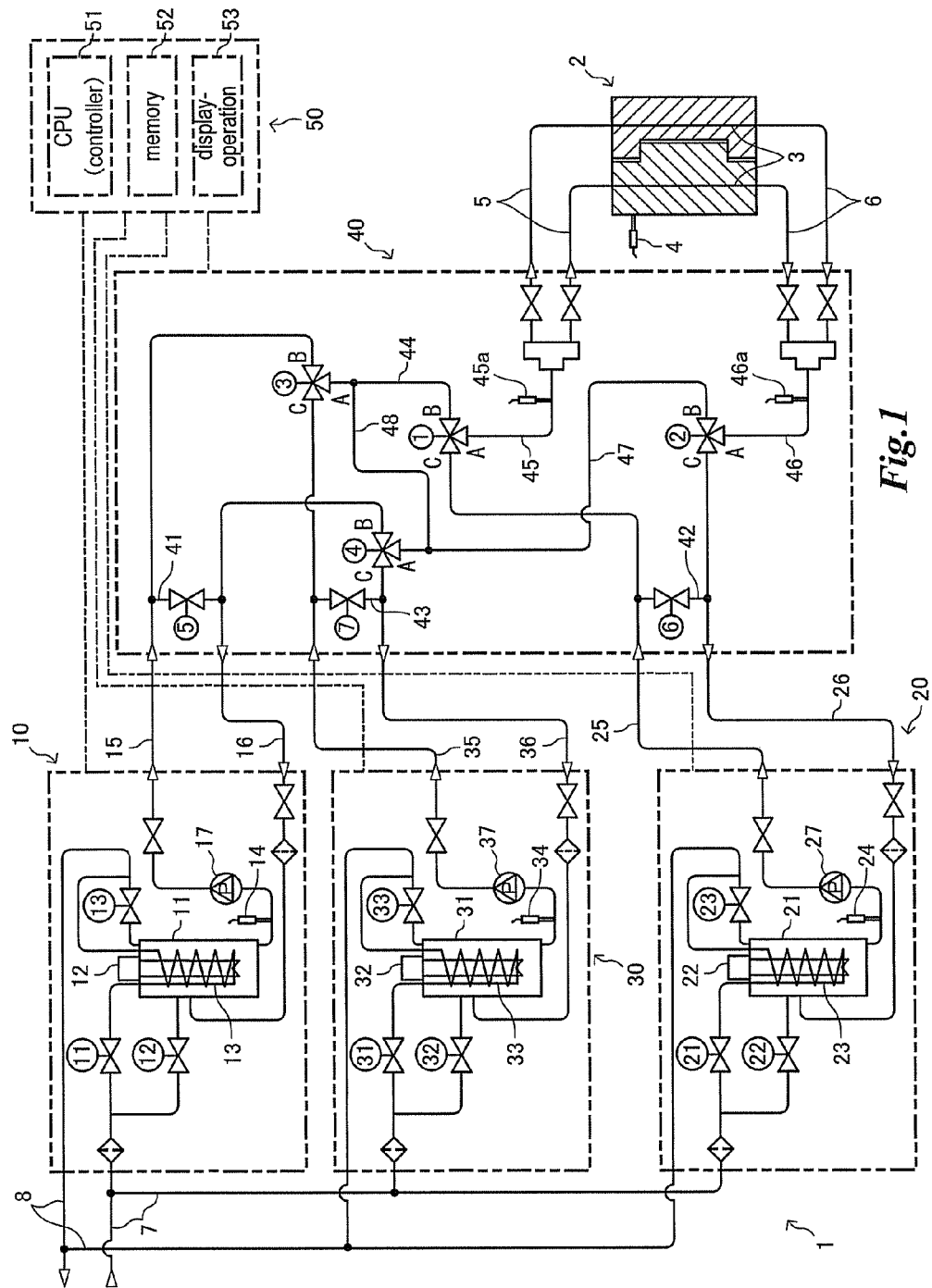
FIG. 1 is a schematic illustration diagrammatically showing one example of the mold temperature control device of one embodiment of the present invention.

Embodiments of the present invention are explained referring to the drawings.

FIG. 1 to FIG. 4 explain the mold temperature control device of the first embodiment of the present invention.

Pipes lines (piping) and the like for flowing medium are diagrammatically shown with solid lines in FIG. 1, FIG. 3, FIG. 4 and FIG. 5a.

As shown in FIG. 1, the mold temperature control device 1 of the embodiment of the present invention has a first medium supply portion 10 for circularly supplying first medium to a medium flow path 3 provided for a mold 2, a second medium supply portion 20 for circularly supplying second medium having different temperature from that of the first medium to the medium flow path 3, and a third medium supply portion 30 for circularly supplying third medium corresponding to the first medium to the medium flow path 3.

In this embodiment, the first medium supply portion 10 is a high temperature medium supply portion 10 for circularly supplying high temperature medium, the second medium supply portion 20 is a low temperature medium supply portion 20 for circularly supplying low temperature medium, and the third medium supply portion 30 is a pre-high temperature medium supply portion 30 for circularly supplying high temperature medium corresponding to the temperature of high temperature medium.

Medium supply paths 15, 25, 35 and medium return paths 16, 26, 36 of the medium supply portions 10, 20, 30 are switchably connected to the medium flow path 3 of the mold 2 by a valve unit 40 as a switching connection portion. Each valve of the valve unit 40 executes open/close control or switch control by a CPU 51 as a controller (control portion) of a control board 50 following the predetermined program to be mentioned later.

Any mold can be used as the mold 2 to be heated or cooled by the mold temperature control device 1 and a mold having a fixed member and a movable member can be generally used. Melted resin in the cylinder of an injection molding machine (not shown) is injected from a nozzle or the like and is charged in a cavity formed with the fixed member and the movable member of the mold 2, thereby obtaining a molded product. The mold 2 is provided with the medium flow path 3 for flowing medium for rising or dropping the temperature of the mold 2. The reference numeral 4 indicates a temperature sensor for detecting the temperature of the mold 2. Switch operation to a mold heating process and a mold cooling process, to be mentioned later, can be executed based on the temperature detected by the temperature sensor 4. Switch operation of each process can be executed in conjunction with molding operation of the injection molding machine, for example, based on mold close signals, pressure-keeping signals, mold open signals of the molding machine.

A medium supply path 5 connected with the valve unit 40 to be mentioned later is connected to an inlet of the medium flow path 3 of the mold 2; and a medium return path 6 connected with the valve unit 40 is connected to an outlet of the medium flow path 3.

In the figures, one medium supply path 5 and one medium return path 6 are connected to the fixed and movable members of the mold 2, respectively. The medium supply path 5 and the medium return path 6 can be diverged into plural paths corresponding to the number of the medium flow paths 3, 3 provided for the fixed member and the movable member of the mold 2 so as to be connected to the inlet and the outlet of the medium flow path 3 of the mold 2.

As shown in the figures, the medium supply portions 10, 20, 30 are substantially the same in configuration. The medium supply portions 10, 20, 30 have storage tanks 11, 21, 31 as a storage portion for storing medium; heaters (heating means) 12, 22, 32 as a heat exchange means for heating stored medium; cooling paths (cooling means) 13, 23, 33 as a heat exchange means for cooling the medium stored in the storage tanks 11, 21, 31; and circulation pumps 17, 27, 37 for circularly supplying the medium stored in the storage tanks 11, 21, 31, to the medium flow path 3 of the mold 2 via the medium supply paths 15, 25, 35 and the medium return paths 16, 26, 36, respectively.

In principle, the circulation pumps 17, 27, 37 can be always operated while the device 1 is being operated.

The storage tanks 11, 21, 31 of the medium supply portions 10, 20, 30 are connected with the medium supply paths 15, 25, 35 and the medium return paths 16, 26, 36 connected to the valve unit 40, respectively. The medium supply paths 15, 25, 35 between the storage tanks 11, 21, 31 and the valve unit 40 have the above-mentioned circulation pumps 17, 27, 37 and manual valves, respectively. The medium return paths 16, 26, 36 between the storage tanks 11, 21, 31 and the valve unit 40 have manual valves and filters, respectively.

Temperature sensors 14, 24, 34 for detecting the temperature of medium are provided in appropriate places such as the outlet side (medium supply side) of the storage tanks 11, 21, 31 of the medium supply portions 10, 20, 30, respectively. In principle, the CPU 51 controls operation of the above-mentioned heat exchange means based on the temperature detected by the temperature sensors 14, 24, 34 in such a manner that, in principle, i.e., in a normal control state, each kind of medium reaches the preset temperature.

A medium supply pipe line (water supply pipe) 7 connected to a medium supply source (water source) and a medium discharge pipe line (discharge pipe) 8 are diverged and connected to the storage tanks 11, 21, 31 of the medium supply portions 10, 20, 30, respectively. The water supply pipe 7 diverged and connected to the medium supply portions 10, 20, 30 has filters; the downstream sides of the filters are further diverged and are provided with cooling pipes. The cooling pipes are connected with spiral cooling paths 13, 23, 33 contained in the storage tanks 11, 21, 31, respectively. The cooling pipes are provided with cooling valves V11, V21, V31, respectively. The water supply pipes 7 provided between the diverged portions of the cooling pipes and the storage tanks 11, 21, 31 are provided with supply (water supply) valves V12, V22, V32, respectively. The discharge sides of the cooling paths 13, 23, 33 are connected to the discharge pipe 8 to be joined. Discharge (drain) valves V13, V23, V33 are provided for the discharge pipes 8 between the joined portions and the storage tanks 11, 21, 31, respectively.

In the above-mentioned medium supply portions 10, 20, 30, on startup of the device 1, the supply valves V12, V22, V32 and the discharge valves V13, V23, V33 are opened, medium at the predetermined pressure (water supply pressure) is stored to reach the predetermined level in the storage tanks 11, 21, 31, and the supply valves V12, V22, V32 and the discharge valves V13, V23, V33 are closed. During operation of the device 1, decrease, increase or the like of the amount of medium can be detected by a level gauge, a float switch and the like in such a manner that medium in each storage tank 11, 21, or 31 is kept at the predetermined level; the supply valves V12, V22, V32 and the discharge valves V13, V23, V33 can be controlled to open or close, thereby appropriately resupplying or discharging medium.

In a normal control state other than a forcible operating mode to be mentioned later, each heat exchange means is controlled to be operated in such a manner that the medium stored in the storage tanks 11, 21, 31 reaches the preset temperature. When medium is heated, the heaters 12, 22, 32 are operated for heating. When medium is cooled down, the cooling valves V11, V21, V31 are opened and cooling medium (cooling water) is supplied to the cooling paths 13, 23, 33 for cooling. In such a normal control state, the heaters 12, 22, 32 and the cooling valves V11, V21, V31 are controlled, for example, by PID control, based on the temperature detected by the temperature sensors 14, 24, 34.

The cooling means for cooling medium is not limited to such a means that medium is cooled by indirectly exchanging heat with the medium stored in the storage tank by means of the cooling path. When medium is water, for example, the medium can be (directly) cooled by supplying cold water. In such a case, cold water at the predetermined water supply pressure can be supplied and a discharge pipe or the like can be provided with a discharge valve or the like to be opened at a pressure value above the predetermined pressure if necessary.

The medium stored in the storage tanks 11, 21, 31 is circularly supplied between the storage tanks 11, 21, 31 and the valve unit 40 through the medium supply paths 15, 25, 35 and the medium return paths 16, 26, 36 by operating the circulation pumps 17, 27, 37.

The set temperature for high temperature medium can be, for example, 90 degrees centigrade to 180 degrees centigrade and that for low temperature medium can be 5 degrees centigrade to 70 degrees centigrade, depending on temperature of resin to be melted and charged and the set temperature of the mold 2.

The above-mentioned water supply pressure and discharge pressure of the circulation pumps 17, 27, 37 are influenced by pressure loss factors such as the kind of medium, and diameter and length of the pipes lines. For example, when the set temperature of high temperature medium, i.e., clear water, is higher than the boiling temperature at normal pressure values, the pressure in the pipe lines can be designed to be kept at which medium does not boil based on the temperature of high temperature medium.

Not shown in the figures, A pressure gauge for detecting the pressure in the pipe line, a relief valve for keeping the pressure in the pipe line, a safety valve for preventing abnormal increase of the pressure in the pipe line, and the like are provided at appropriate places.

Medium is not limited to water or other medium such as oil and alcoholic medium can be used.

The storage tanks, the circulation pumps and so on of the medium supply portions 10, 20, 30, not shown in the figures, are housed in each casing. Instead of providing the circulation pumps and so on in each medium supply portion, they can be provided in one casing.

Insulation materials can be externally fitted on (can cover) medium supply paths 15, 25, 35 and medium return paths 16, 26, 36 from the medium supply portions 10, 20, 30 to the valve unit 40.

The figures being simplified, the medium supply portions 10, 20, 30 and the valve unit 40 have connection ports and the like for connecting the medium supply paths 15, 25, 35 and the medium return paths 16, 26, 36, respectively. The valve unit 40 has connection ports and the like to be connected with the medium supply path 5 and the medium return path 6 to be connected with the medium flow path 3 of the mold 2.

Cooling medium to be supplied to the cooling means can be cooled by a cooling device such as a chiller depending on the set temperature of low temperature medium, cold water from a cooling tower and the like provided for a factory and the like can be used as cooling medium, or tap water at a room temperature can be used.

The valve unit 40 has a plurality of switch valves V1, V2, V3, V4 for switchably communicating the medium supply paths 15, 25, and the medium return paths 16, 26, 36 connected to the storage tanks 11, 21, 31 of the medium supply portions 10, 20, 30 to the medium flow path 3 of the mold 2.

The figures show four three-way valves V1, V2, V3, V4. V1 is a high/low medium supply switch valve provided on the medium supply side for switching a high temperature medium (the first medium and the third medium) side and a low temperature medium (the second medium) side. V2 is a high/low medium return switch valve provided on the medium return side for switching the high temperature medium (the first medium and the third medium) side and the low temperature medium (the second medium) side. V3 is a high/high medium supply switch valve provided on the medium supply side for switching the first medium side and the third medium side. V4 is a high/high medium return switch valve provided on the medium return side for switching the first medium side and the third medium side.

The medium supply path 15 of the high temperature medium supply portion 10 is connected to one connection port (a port B) of the high/high medium supply switch valve V3. The medium return path 16 is connected to one connection port (a port B) of the high/high medium return switch valve V4.

The medium supply path 25 of the low temperature medium supply portion 20 is connected to one connection port (a port C) of the high/low medium supply switch valve V1. The medium return path 26 is connected to one connection port (a port C) of the high/low medium return switch valve V2.

The medium supply path 35 of the pre-high temperature medium supply portion 30 is connected to one connection port (a port C) of the high/high medium supply switch valve V3. The medium return path 36 is connected to one connection port (a port C) of the high/high medium return switch valve V4.

One connection port (a port A) of the high/high medium supply switch valve V3 and one connection port (a port B) of the high/low medium supply switch valve V1 are connected by a high/high (the first and the third) medium supply path 44. One connection port (a port A) of the high/high medium return switch valve V4 and one connection port (a port B) of the high/low medium return switch valve V2 are connected by a high/high (the first and the third) medium return path 47. The high/high medium supply path 44 and the high/high medium return path 47 are connected by a bypass path 48.

A medium supply path 45 connected to the medium supply path 5 connected to the medium flow path 3 of the mold 2 is connected to one connection port (a port A) of the high/low medium supply switch valve V1. A medium return path 46 connected to the medium return path 6 connected to the medium flow path 3 of the mold 2 is connected to one connection port (a port A) of the high/low medium return switch valve V2. The medium supply path 45 is provided with a temperature sensor 45a for detecting temperature of the medium (medium temperature on inlet side) to be supplied to the medium flow path 3 of the mold 2. The medium return path 46 is provided with a temperature sensor 46a for detecting the temperature of the medium (medium temperature on outlet side) discharged from the medium flow path 3 of the mold 2.

The medium supply paths 15, 25, 35 and medium return paths 16, 26, 36 on the sides of the medium supply portions 10, 20, 30 of the switch valves V1, V2, V3, V4 are connected via bypass paths 41, 42, 43, respectively; and bypass valves V5, V6, V7 are provided for the bypass paths 41, 42, 43, respectively.

The valve unit 40 constituting the switching connection portion can be attached to or be incorporated into the medium supply portions 10, 20, 30. In the embodiment of the present invention, the valve unit 40 including the above-mentioned valves and so on is designed to be provided adjacent to the mold 2. The valve unit 40 can be provided on a pedestal or the like placed adjacent to the mold 2, or can be provided on the floor or the like under the mold 2. In such a case, compared with the prior art wherein a high temperature side and a low temperature side are switched adjacent to or in an apparatus, the volumes corresponding to the common pipe line on the medium supply side and the common pipe line on the medium return side are able to be relatively reduced, the common pipe line connecting each medium supply portion and the medium flow path of the mold at the time of switching. Accordingly, burden to the heat exchange means in each medium supply portion is able to be relatively reduced and the temperature of each kind of medium is able to be returned to the set temperature more rapidly. As a result, swift switch control is achieved and molding cycle is effectively shortened.

Valves (an open/close valve, a switch valve) provided for the above-mentioned pipe lines such as the water supply pipe, the water discharge pipe, the medium supply path, the medium return path, and the bypass path include any valve such as an electromagnetic valve, an air-operated electromagnetic valve, a motor driven valve and the like of which open/close operations or switch operations are able to be controlled by the CPU 51 to be mentioned later. The air-operated electromagnetic valves can be used to be connected a compression air source for supplying compression air for driving via a filter, a regulator, and the like.

Any switch valve capable of executing each switch mode to be mentioned later (each medium supply mode and so on) can be used. In place of providing the three-way switch valves shown in the figures, single open/close valves can be provided in combination. Otherwise, a multi-port/multi-position switch valve and/or the like can be provided at an appropriate place.

The control board 50, having a timer means, an arithmetic processing unit, and so on, comprises the CPU 51 controlling the above-mentioned valves, units, and portions of the mold temperature control apparatus 1 following the predetermined programs, a memory portion 52 and a display/operation portion 53, each of them being connected to the CPU 51 via signal lines or the like. The CPU 51 is connected with the above-mentioned valves, units, sensors, and so on via signal lines or the like. In the display/operation portion 53, several setting operations are executed, items to be set in advance (the set temperature of the mold, the set temperature of each medium, the switch time, and so on to be mentioned later) are input, and several set conditions and several kinds of drive mode are displayed.

The memory portion 52 comprises several memories and stores setting conditions and input values set and input by the display/operation portion 53, several programs such as a control program for executing several operations such as basic operations to be mentioned later, several operation conditions set in advance and several data tables, and so on.

The control board 50 can be incorporated in any one of the casings of the medium supply portions 10, 20, 30 or can be provided on or beside any one of the casings of the medium supply portions 10, 20, 30.

One example of basic operations executed in the above-mentioned mold temperature control device 1 is explained based on FIG. 2 to FIG. 4.

Figure 2A:
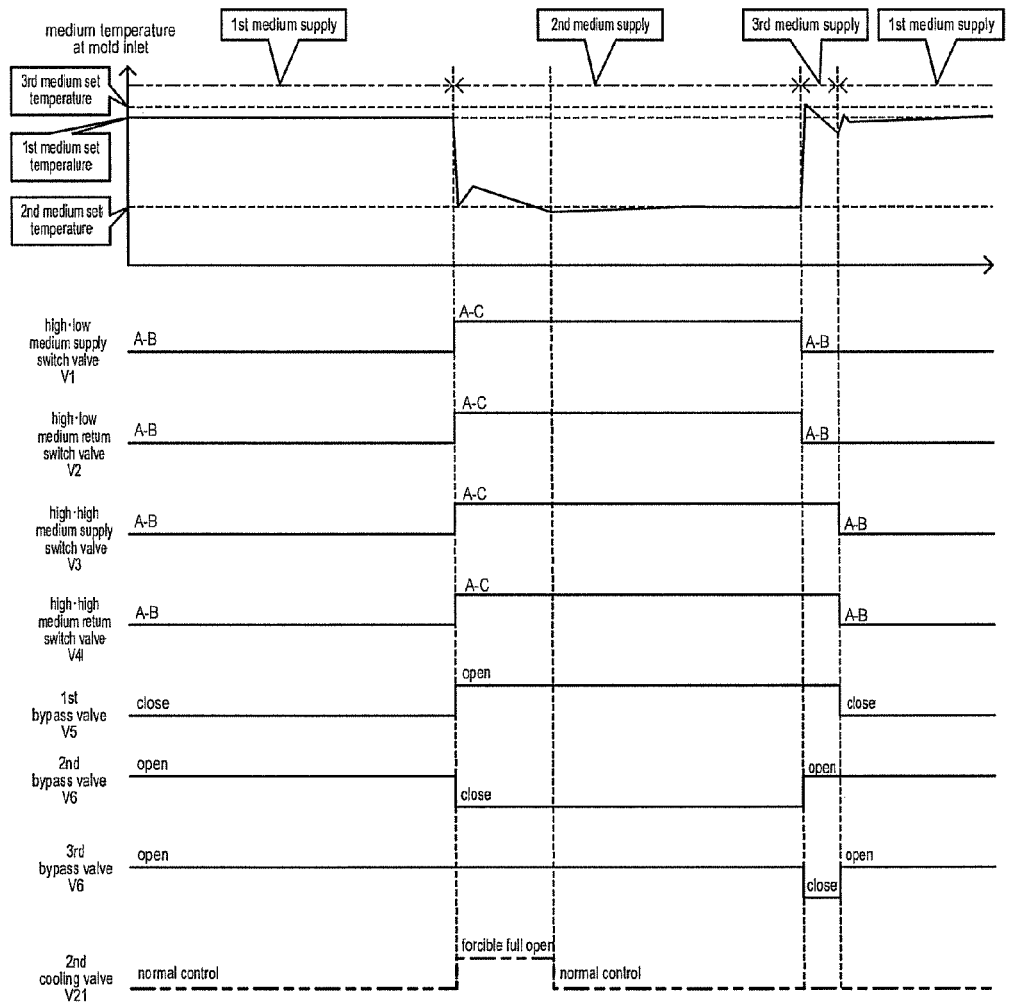
FIG. 2a is a schematic time chart showing one example of basic operation executed in the mold temperature control device of the above-mentioned example.
Figure 2B:
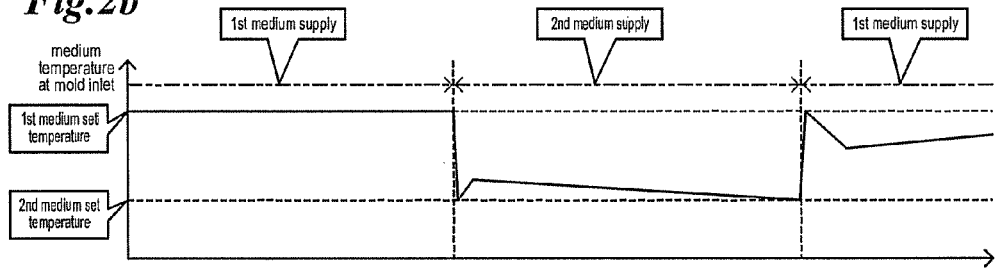
FIG. 2b is a schematic graph diagrammatically showing temperature change on the inlet side of the mold when a conventional mold temperature control device is operated.

The graph in FIG. 2a diagrammatically shows change of the temperature values detected by the temperature sensor 45a detecting medium temperature on the inlet side of the mold 2 over time on the abscissa and detected by the temperature sensor 45a on the ordinate. The time chart in FIG. 2a diagrammatically shows open/close operations and switch operations of the valves. The graph in FIG. 2b diagrammatically shows change of the medium temperature on the inlet side of the mold 2 when the same time control as that of FIG. 2a is executed using the conventional mold temperature control device.

In FIG. 3 and FIG. 4, opened open/close valves are shown with white, closed open/close valves are shown with black, and cool valves under a normal control state is shown with hatching like pear-skin. Communicating ports of the switch valves are shown with white and blocked ports thereof are shown with black. Pipe lines for flowing high temperature medium is diagrammatically shown with dotted lines and pipe lines for flowing low temperature medium is diagrammatically shown with chain lines.

In this operation example, the second medium supply mode circularly supplying the second medium (low temperature medium) to the medium flow path 3 of the mold 2 is switched to the third medium supply mode circularly supplying the third medium (high temperature medium corresponding to the first medium) to the medium flow path 3 and to the first medium supply mode circularly supplying the first medium (high temperature medium) to the medium flow path 3.

After the third medium supply mode, at least the second medium remaining in the medium flow path 3 and in the pipe lines 5, 6 connecting the medium flow path 3 and the valve unit 40 is replaced with the third medium, then the mode is switched to the first medium supply mode.

Switching from the first medium supply mode to the second medium supply mode, the heat exchange means (the cooling valve V21 constituting a cooling means in this embodiment) of the second (low temperature) medium supply portion 20 is forcibly operated, thereafter the heat exchange means V21 is controlled to be operated based on the temperature detected by the second medium temperature sensor 24 in such a manner that the second medium reaches the predetermined temperature.

In this example, the set temperature of the third medium is higher than that of high temperature medium, namely the first medium. In the following examples, the set temperature of the first medium is 145 degrees centigrade, that of the second medium is 60 degrees centigrade, and that of the third medium is 160 degrees centigrade; however, the temperature values of medium are not limited to the above. For example, when the set temperature of the third medium which is set higher than that of the first medium is too high, it is required to correspondingly set water supply pressure or to secure corresponding pressure resistance. Therefore, the set temperature of the third medium can be 10 to 40 degrees centigrade higher than that of the first medium. Each switch mode and processes executed in each switch mode are specifically explained.

<Mold Heating Process: First Medium Supply Process>

When the mold 2 is heated by circularly supplying high temperature medium in the medium flow path 3 of the mold 2, valves are controlled to be opened or closed (or to be switched) by the CPU 51 so as to supply the first medium (high temperature medium) while the apparatus 1 is being operated. As shown in FIG. 2a and FIG. 3a, the ports A and the ports B of the switch valves V1, V2, V3, V4 are communicated and the ports C are blocked. The first bypass valve V5 provided for the first bypass path 41 connecting the medium supply path 15 and the medium return path 16 connected to the high temperature medium supply portion 10 is closed, the second bypass valve V6 provided for the second bypass path 42 connecting the medium supply path 25 and the medium return path 26 connected to the low temperature medium supply portion 20 is opened, and the third bypass valve V7 provided for the third bypass path 43 connecting the medium supply path 35 and the medium return path 36 connected to the pre-high temperature medium supply portion 30 is opened.

In the high temperature medium supply portion 10, high temperature medium is circularly supplied to the medium flow path 3 of the mold 2 via the medium supply paths 15, 44, 45, 5 and the medium return paths 6, 46, 47, 16 by means of the circulation pumps 17, 27, 37 provided for the medium supply portions 10, 20, 30, respectively, thus the mold 2 is heated. In the low temperature medium supply portion 20, low temperature medium is circulated via the second bypass path 42. In the pre-high temperature medium supply portion 30, high temperature (the third) medium is circulated via the third bypass path 43. In the first medium supply process, the medium temperature on the inlet side of the mold 2 slightly changes following heat exchange of the mold 2 and injection process and so on of melted resin to the cavity of the mold 2; however, the medium temperature changes around the preset temperature (145 degrees centigrade, for example) of high temperature medium.

<Mold Cooling Process: Second Medium Supply/Switch Process>

In this example, the above-mentioned first medium supply process is switched to the second medium supply mode and the second medium supply/switch process is also executed to forcibly operate the second cooling valve V21 constituting the heat exchange means of the low temperature medium supply portion 20.

The valves in the first medium supply mode are controlled to be opened or closed (or to be switched) by the CPU 51 so as to supply the second medium (low temperature medium).

As shown in FIG. 2a and FIG. 3b, the ports A and the ports C of the switch valves V1, V2, V3, V4 are communicated and the ports B are blocked. The first bypass valve V5 provided for the first bypass path 41 is opened, the second bypass valve V6 provided for the second bypass path 42 is closed, and the third bypass valve V7 provided for the third bypass path 43 is opened.

In the low temperature medium supply portion 20, low temperature medium is circularly supplied to the medium flow path 3 of the mold 2 via the medium supply paths 25, 45, 5 and the medium return paths 6, 46, 26 by means of the circulation pumps 17, 27, 37, respectively, provided for the medium supply portions 10, 20, thus the mold 2 is cooled. In the high temperature medium supply portion 10, high temperature (the first) medium is circulated via the first bypass path 41. In the pre-high temperature medium supply portion 30, high temperature (the third) medium is circulated via the third bypass path 43, as mentioned above. In addition, high temperature (the third) medium is circulated via the bypass path 48 connecting the high/high medium supply path 44 and the high/high medium return path 47. High temperature (the third) medium is circulated in the pipe lines on the side of the mold 2 of the third bypass path 43 via the bypass path 48, thereby temperature of the high temperature medium hardly drops in the pipe lines and the medium at high temperature is able to be supplied to the mold 2 at the time of the third medium supply mode to be mentioned later.

In this example, the valves are opened, closed or switched from the first medium supply mode to the second medium supply mode as mentioned above, and the second cooling valve V21 is fully opened forcibly; the largest amount of cooling medium (cooling water) is supplied to the cooling path 23 of the low temperature medium supply portion 20. As mentioned above, under normal control, the second cooling valve V21 is controlled by PID based on the temperature detected by the second medium temperature sensor 24. Immediately after the first medium supply mode is switched to the second medium supply mode, the first medium at high temperature remains in the medium flow path 3 of the mold 2 and in the medium supply paths 5, 45, the medium return paths 6, 46, and so on connected to the medium flow path 3. The remaining high temperature medium is returned to the low temperature medium supply portion 20, and the medium temperature in the storage tank 21 of the low temperature medium supply portion 20 sharply rises. If normal control is executed, it takes relatively longer time to return the temperature of low temperature medium to the preset temperature.

As shown in FIG. 2b, the temperature of the medium on the inlet side of the mold sharply drops close to the set temperature of low temperature medium immediately after the first medium supply mode is switched to the second medium supply mode, and rises when the remaining high temperature medium is returned. It takes relatively longer time to return the temperature of low temperature medium to the preset temperature under normal control such as PID control because the medium supply rate of cooling water to the cooling path 23 is reduced as the temperature reaches close to the set temperature.

In this example, immediately after the first medium supply mode is switched to the second medium supply mode, the largest amount cooling water is supplied to the cooling path 23 of the low temperature medium supply portion 20 by fully opening the second cooling valve V21 forcibly in place of normal temperature control based on the temperature detected by the second medium temperature sensor 24. Thus, low temperature medium supplied from the low temperature medium supply portion 20 is able to be rapidly returned to the preset temperature (60 degrees centigrade, for example) as shown in the diagrammatical graph in FIG. 2a. Under such control, the medium temperature on the inlet side of the mold 2 shows slight undershoot; however, there causes no problems because the mold 2 has relatively larger heat capacity and is heated in the previous process, and the mold 2 is able to be cooled more rapidly.

Forcible operation of the second cooling valve V21 constituting the heat exchange means of the low temperature medium supply portion 20 executed in the second medium supply/switch process can be kept until the end of the preset forcible operation time. The forcible operation time can be set in advance based on operation test and so on, input as the preset input item by means of the display/operation portion 53, and stored in the memory portion 52.

Alternately, the forcible operation of the second cooling valve 21 can be kept until the temperature detected by the second medium temperature sensor 24 reaches the set temperature of low temperature medium.

The CPU 51 detects whether the predetermined conditions are satisfied or not.

In place of the embodiment wherein the second cooling valve V21 constituting the heat exchange means of the low temperature medium supply portion 20 is forcibly operated until the predetermined conditions are satisfied, two-position control (ON/OFF control) can be executed based on the temperature detected by the second medium temperature sensor 24 until the predetermined conditions are satisfied as mentioned above. In this case, low temperature medium is able to be returned to the preset temperature more rapidly compared with normal control such as PID control.

While the second medium supply/switch process is being executed, the heater 22 constituting the heating means of the second medium supply portion 20 can be forcibly stopped. Namely, temperature control based on the set temperature can be disabled.

<Mold Cooling Process: Second Medium Supply Process>

When the above-mentioned predetermined conditions are satisfied, namely at the end of the above-mentioned forcible operation time (or the temperature of the second medium temperature sensor 24 reaches the set temperature), normal control is executed based on the temperature detected by the second medium temperature sensor 24 in such a manner that low temperature medium reaches the set temperature, executing the second medium supply process. Namely, as shown in FIG. 2a and FIG. 4a, the valves are kept in the above-mentioned second medium supply mode, low temperature medium is circularly supplied to the medium flow path 3 of the mold 2, and the mold 2 is cooled.

In the second medium supply process, the medium temperature on the inlet side of the mold 2 slightly changes by exchanging heat with the mold 2 around the preset temperature (60 degrees centigrade, for example) of low temperature medium from the above-mentioned undershoot temperature.

<Mold Heating Process: Third Medium Supply Process>

After the above-mentioned second medium supply process, valves in the second medium supply mode are controlled to be opened or closed (or to be switched) by the CPU 51, and the mode is switched to the third medium (high temperature medium) supply mode, then the third medium supply process is executed.

Namely, as shown in FIG. 2a and FIG. 4b, the ports A and the ports B of the high/low medium supply switch valve V1 and the high/low medium return switch valve V2 are communicated, the ports C are blocked, and other switch valves V3, V4 are kept in the second medium supply mode. The second bypass valve V6 provided for the second bypass path 42 is opened, the third bypass valve V7 provided for the third bypass path 43 is closed, and the first bypass valve V5 provided for the first bypass path 41 is opened.

In the above-mentioned mode, in the pre-high temperature medium supply portion 30, high temperature (the third) medium is circularly supplied to the medium flow path 3 of the mold 2 via the medium supply paths 35, 44, 45, 5 and the medium return paths 6, 46, 47, 36 by means of the circulation pumps 17, 27, 37 provided for the medium supply portions 10, 20, 30, respectively, thus the mold 2 is heated. In the high temperature medium supply portion 10, high temperature medium is circulated via the first bypass path 41. In the low temperature medium supply portion 20, low temperature medium is circulated via the second bypass path 42.

In the third medium supply process, immediately after the second medium supply mode is switched to the third medium supply mode, the medium temperature on the inlet side of the mold 2 sharply rises from the set temperature of low temperature medium to the set temperature (160 degrees centigrade, for example) of high temperature (the third) medium. Then the medium temperature in the storage tank 31 of the third medium supply portion 30 sharply drops and the medium temperature on the inlet side of the mold 2 also drops because the second medium at low temperature remaining in the medium flow path 3 of the mold 2 and in the medium supply paths 5, 45, the medium return paths 6, 46, and so on connected to the medium flow path 3 is returned to the third medium supply portion 30. In this operation example, the set temperature of the third medium is set to be higher than the set temperature of the first medium as mentioned above, so that temperature drop range is able to be reduced compared with the conventional example shown in FIG. 2b.

The third medium supply process can be executed until at least the second medium (remaining second medium) at low temperature remaining in the medium flow path 3 and in the pipe lines 5, 6 connecting the medium flow path 3 and the valve unit 40 is replaced with the third medium at high temperature.

In this case, the CPU 51 can be designed to detect whether the above-mentioned remaining second medium is replaced with the third medium. Such detection by the CPU 51 can be executed depending on the setting in advance and the switch time based on operation test or can be executed based on the values detected by detection means such as a temperature sensor and a flow meter. For example, the third medium supply mode can be kept until the end of the preset third medium supply time. The third medium supply time can be set in advance based on operation test and so on, input as the preset input item by means of the display/operation portion 53, and stored in the memory portion 52.

In the example, the third medium supply process can be kept until the temperature detected by the temperature sensor 46a for detecting the medium temperature on the outlet side of the mold 2 exceeds the predetermined switch temperature. In addition, the third medium supply process can be kept until the temperature detected by the third medium temperature sensor 34 or the temperature detected by the temperature sensor 45a for detecting the medium temperature on the inlet side of the mold 2 reaches lower than the predetermined switch temperature. Such a switch temperature value can be set in advance based on operation test and so on, input as the preset input item by means of the display/operation portion 53, and stored in the memory portion 52, as mentioned above.

Furthermore, the flow amount corresponding to the above-mentioned remaining second medium can be detected by a flow meter provided at an appropriate place.

When the second medium supply mode is switched to the third medium supply mode, the heater 32 of the third medium supply portion can be forcibly operated until the above-mentioned predetermined conditions (the third medium supply time, the switch temperature, the flow rate and so on) are satisfied.

Or two-position control (ON/OFF control) can be executed based on the temperature detected by the third medium temperature sensor 34 until the above-mentioned predetermined conditions are satisfied. In this embodiment, temperature drop range by flowing low temperature medium is able to be reduced and the third medium at high temperature is able to be supplied rapidly and circularly.

In case of executing such an embodiment, the cooling means of the third medium supply portion 30 can be forcibly stopped while the third medium supply process is being executed.

<Mold Heating Process: First Medium Supply Process>

When the above-mentioned predetermined conditions are satisfied, the valves in the third medium supply mode are controlled to be opened or closed (or to be switched) by the CPU 51, the mode is switched to the first medium supply mode, and then the first medium supply process is executed.

Namely, as shown in FIG. 2a and FIG. 3a, the ports A and the ports B of the high/high medium supply switch valve V3 and the high/high medium return switch valve V4 are communicated, respectively, the ports C are blocked, and other switch valves V1, V2 are kept in the third medium supply mode. The first bypass valve V5 provided for the first bypass path 41 is closed, the third bypass valve V7 provided for the third bypass path 43 is opened, and the second bypass valve V6 provided for the second bypass path 42 is opened.

In the first medium supply mode, the medium temperature on the inlet side of the mold 2 sharply rises to the set temperature of high temperature medium immediately after the third medium supply mode is switched to the first medium supply mode. Then, by exchanging heat with the mold 2, the medium temperature on the inlet side of the mold 2 drops slightly, i.e., not largely, because the remaining second medium is supplied to the third medium supply portion 30 in the third medium supply mode. The medium temperature comes close to the set temperature of high temperature medium and changes around the set temperature.

In this operation example, the first medium at the preset temperature is able to be rapidly supplied to the medium flow path 3 of the mold 2 in the first medium supply mode.

In the conventional device, as shown in FIG. 2b, in case that the second medium supply mode is switched to the first medium supply mode, the medium temperature on the inlet side of the mold sharply rises to the set temperature of high temperature medium immediately after the second medium supply mode is switched to the first medium supply mode, but the medium temperature drops when the remaining low temperature medium is returned. It takes relatively longer time to return the temperature of high temperature medium to the preset temperature. However, in this operation example, the first medium at the preset temperature is able to be rapidly supplied to the medium flow path 3 of the mold 2 in the first medium supply mode.

As mentioned above, the first medium supply process, the second medium supply/switch process, the second medium supply process, the third medium supply process are repeatedly executed in this order.

As mentioned above, in the mold temperature control device 1 of the embodiment of the present invention, when the mold heating process is switched to the mold cooling process and when the mold cooling process is switched to the mold heating process, each medium temperature is able to be rapidly returned to the preset temperature of low temperature medium or high temperature medium and the medium is able to be circularly supplied to the medium flow path 3 of the mold 2. The mold 2 is able to be rapidly heated or cooled, thereby shortening molding cycle.

Compared with the above-mentioned embodiment in which hot water and the cold water are temporarily stored in the temporary storage tank alternately, in this embodiment, there hardly causes temperature drop or temperature rise due to mixture or disturbance such as heat release. When each mode is surely and rapidly switched, medium is able to be returned to the set temperature of low temperature medium or the set temperature of high temperature medium.

Furthermore, the mold temperature control device 1 of the embodiment of the present invention is able to easily execute such control that the set temperature of the first medium at high temperature differs from that of the third medium at high temperature.

As mentioned in the above operation example, the third medium supply process is in execution until at least the second medium (remaining second medium) at low temperature remaining in the medium flow path 3 and in the pipe lines 5, 6 connecting the medium flow path 3 and the valve unit 40 is replaced with the third medium. The amount of the remaining second medium to be returned to the high temperature medium supply portion 10 is able to be effectively reduced and the first medium at the preset temperature is able to be more rapidly supplied to the medium flow path 3 of the mold 2.

In the above-mentioned operation example, the set temperature of the third medium is set to be higher than that of the first medium, but the temperature values can be the same.

Another embodiment of the mold temperature control device of the present invention is explained referring to the drawings. FIG. 5 is an explanatory view of the second embodiment of the mold temperature control device.

Difference with the first embodiment is mainly explained, the same structures as the first embodiment have the same reference numerals, and their explanation is omitted or briefly done. The explanation of the same operations is also omitted or briefly done.

Figure 5A:
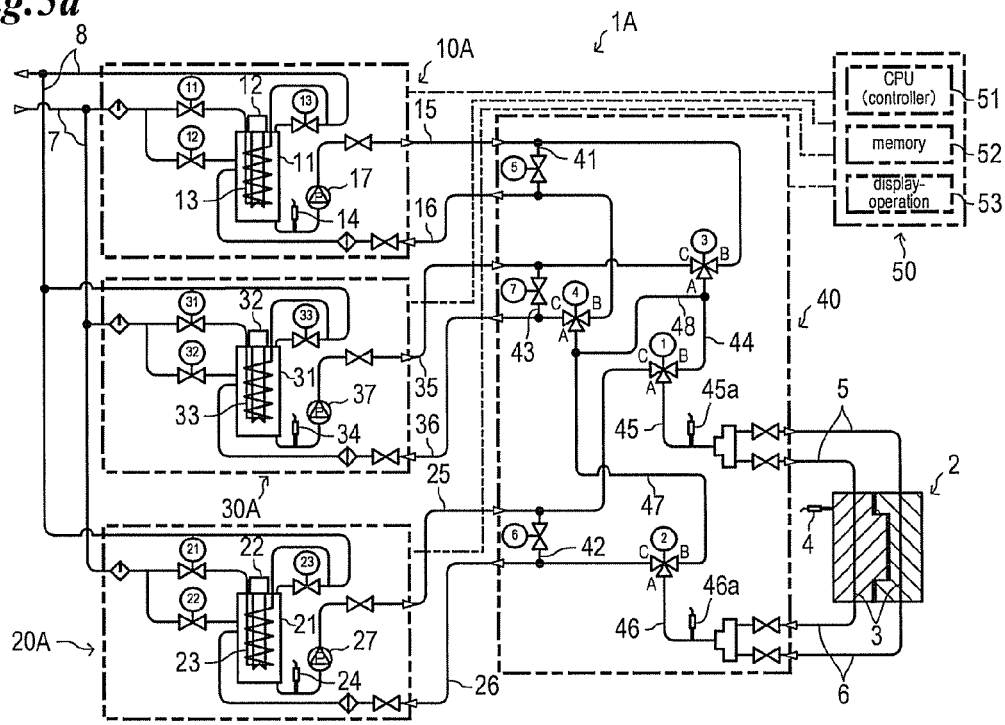
FIG. 5a is a schematic illustration diagrammatically showing one example of the mold temperature control device of another embodiment of the present invention.
Figure 5B:
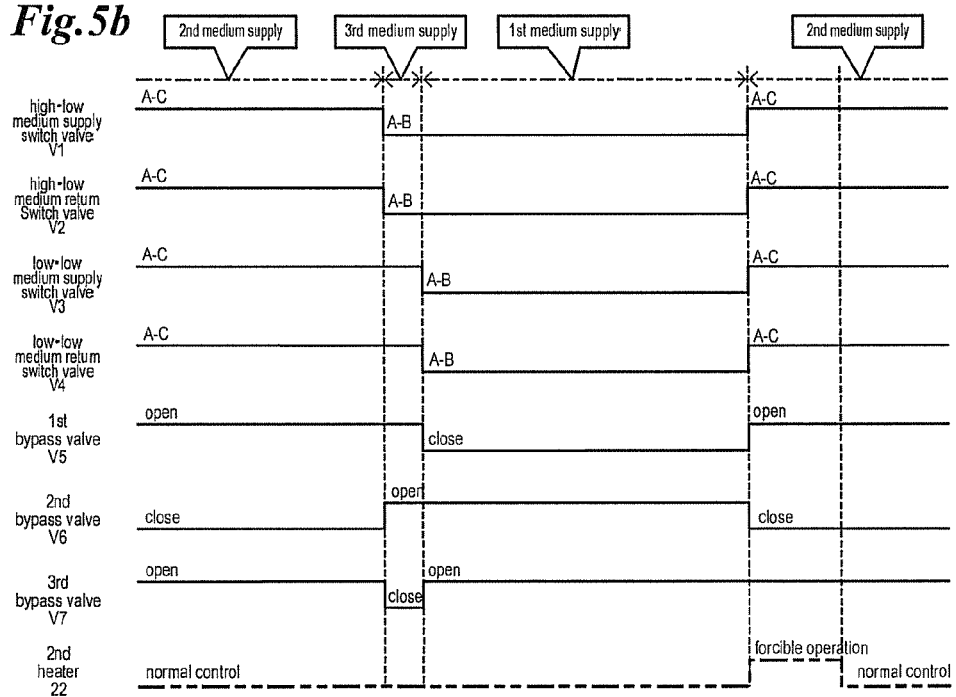
FIG. 5b is a schematic time chart showing one example of basic operation executed in the mold temperature control device.

In a mold temperature control device 1A of the embodiment of the present invention, as shown in FIG. 5a, a first medium supply portion 10A is a low temperature medium supply portion 10A for circularly supplying low temperature medium, a second medium supply portion 20A is a high temperature medium supply portion 20A for circularly supplying high temperature medium, and a third medium supply portion 30A is a pre-low temperature medium supply portion 30A for circularly supplying low temperature medium corresponding to the temperature of low temperature medium.

In basic operation example executed by the mold temperature control device 1A of this embodiment, the set temperature of the third medium is set to be lower than that of low temperature medium, namely the first medium. For example, if the set temperature of the third medium is much lower than the set temperature of the first medium, it is necessary to provide cooling medium and so on corresponding to the temperature, so that the set temperature of the first medium can be 10 to 40 degrees centigrade lower than the set temperature of the first medium. In the following explanation, the set temperature values of high temperature medium and low temperature medium are the same as those in the first embodiment and the set temperature of the third medium is 45 degrees centigrade. Next explained is one example of basic operations executed by the mold temperature control device 1A of the embodiment of the present invention referring to FIG. 5b.

<Mold Heating Process: Second Medium Supply Process>

When the mold 2 is heated by circularly supplying high temperature medium to the medium flow path 3 of the mold 2, at the time of operating the device 1A, valves are controlled to be opened or closed (or to be switched) by the CPU 51 and second medium (high temperature medium) is supplied like the basic operations of the first embodiment.

In this mode, in the high temperature medium supply portion 20A, high temperature medium is circularly supplied to the medium flow path 3 of the mold 2 via the medium supply paths 25, 45, 5 and the medium return paths 6, 46, 26 by means of the circulation pumps 17, 27, 37 provided for the medium supply portions 10A, 20A, 30A, respectively. In the low temperature supply portion 10A, low temperature medium is circulated via the first bypass path 41. In the pre-low temperature medium supply portion 30A, like the first embodiment, low temperature (the third) medium is circulated via the third bypass path 43 and is also circulated via the bypass path 48 connecting the low/low medium supply path 44 and the low/low medium return path 47. Low temperature (the third) medium is thus circulated via the bypass path 48 in the pipe lines on the mold 2 side of the third bypass path 43, so that the temperature of low temperature medium hardly rises in the pipe lines and the medium at low temperature is able to be more rapidly supplied to the mold 2 in the third medium supply mode to be mentioned later.

<Mold Cooling Process: Third Medium Supply Process>

After the above-mentioned second medium supply process, like the basic operations explained in the first embodiment, the valves in the second medium supply mode are controlled to be opened or closed (or to be switched) by the CPU 51, the mode is switched to the third medium (low temperature medium) supply mode and the third medium supply process is executed.

In this mode, in the pre-low temperature medium supply portion 30A, low temperature (the third) medium is circularly supplied to the medium flow path 3 of the mold 2 via the medium supply paths 35, 44, 45, 5 and the medium return paths 6, 46, 47, 36 by means of the circulation pumps 17, 27, 37 provided for the medium supply portions 10A, 20A, 30A, respectively, thereby cooling the mold 2. In the low temperature medium supply portion 10A, low temperature medium is circulated via the first bypass path 41. In the high temperature supply portion 20A, high temperature medium is circulated via the second bypass path 42.

In the third medium supply process, the medium temperature on the inlet side of the mold 2 sharply drops to the set temperature (45 degrees centigrade, for example) of low temperature (the third) medium from the set temperature of high temperature medium immediately after the second medium supply mode is switched to the third medium supply mode. Thereafter, the second medium at high temperature remains in the medium flow path 3 of the mold 2 and in the medium supply paths 5, 45, the medium return paths 6, 46, and so on connected to the medium flow path 3 and the remaining high temperature medium is returned to the third medium supply portion 30A, so that the medium temperature in the storage tank 31 of the third medium supply portion 30A sharply rises and the medium temperature on the inlet side of the mold 2 also rises. In this example, the set temperature of the third medium is set to be lower than that of the first medium, thereby reducing the temperature rise range like the first embodiment.

The third medium supply process can be executed until at least the second medium (remaining second medium) at high temperature remaining in the medium flow path 3 and in the pipe lines 5, 6 connecting the medium flow path 3 and the valve unit 40 is replaced with the third medium at low temperature, like the first embodiment.

In this case the CPU 51 can detect whether the remaining second medium is replaced with the third medium like the above-mentioned embodiment. Such detection by the CPU 51 can depend on the third medium supply time or values detected by several kinds of detection means as mentioned above.

When the second medium supply mode is switched to the third medium supply mode, the cooling valve V31 of the third medium supply portion 30A can be fully opened forcibly until the above-mentioned predetermined conditions (the third medium supply time, the switch temperature, the flow rate and so on) are satisfied. Or two-position control (ON/OFF control) can be executed based on the temperature detected by the third medium temperature sensor 34 until the predetermined conditions are satisfied. In this embodiment, temperature rise range caused by flowing high temperature medium is able to be reduced and third temperature medium at lower temperature is able to be circularly supplied.

In case of executing such an embodiment, during the third medium supply process, a heating means of the third medium supply portion 30A can be forcibly stopped.

<Mold Cooling Process: First Medium Supply Process>

After the above-mentioned predetermined conditions are satisfied, like the basic operations explained in the first embodiment, the valves in the third medium supply mode are controlled to be opened or closed (or to be switched) by the CPU 51, the mode is switched to the first medium supply mode and the first medium supply process is executed.

In this mode, in the low temperature medium supply portion 10A, low temperature medium is circularly supplied to the medium flow path 3 of the mold 2 via the medium supply paths 15, 44, 45, 5 and the medium return paths 6, 46, 47, 16 by means of the circulation pumps 17, 27, 37 provided for the medium supply portions 10A, 20A, 30A, respectively, thereby cooling the mold 2. In the high temperature supply portion 20A, high temperature medium is circulated via the second bypass path 42. In the pre-low temperature medium supply portion 30A, low temperature (the third) medium is circulated via the third bypass path 43.

In the first medium supply process, the medium temperature on the inlet side of the mold 2 sharply drops to the set temperature of low temperature immediately after the third medium supply mode is switched to the first medium supply mode. Thereafter, by exchanging heat with the mold 2, the medium temperature rises slightly, i.e., not largely, because the remaining second medium is supplied to the third medium supply portion 30A in the third medium supply mode, reaches close to the set temperature (60 degrees centigrade, for example) of low temperature medium, and changes around the set temperature.

In the basic operations of the embodiment of the present invention, like the first embodiment, the first medium at the preset temperature is able to be rapidly supplied to the medium flow path 3 of the mold 2 in the first medium supply mode.

<Mold Heating Process: Second Medium Supply/Switch Process>

After the first medium supply process, in this operation example, like the first embodiment, the mode is switched to the second medium supply mode and the second medium supply/switch process is executed such that the heater (the second heater) 22 constituting a heat exchange means of the high temperature medium supply portion 20A is forcibly operated.

Like the first embodiment, in this process, the valves in the first medium supply mode are controlled to be opened or closed (or to be switched) by the CPU 51, and the mode is switched to the second medium (high temperature medium) supply mode.

As mentioned above, the valves are controlled to be opened or closed, or to be switched from the first medium supply mode to the second medium supply mode, the second heater 22 is forcibly operated, and the medium in the storage tank 21 of the high temperature medium supply portion 20A is forcibly heated. Namely, like the first embodiment, the second medium supply/switch process is executed until the predetermined conditions are satisfied; the second heater 22 is forcibly operated without executing current control based on normal control such as PID control. Then, high temperature medium supplied from the high temperature medium supply portion 20A is able to be rapidly returned to the preset temperature (145 degrees centigrade, for example). When such control is executed, the medium temperature on the inlet side of the mold 2 slightly overshoots, but there causes no problems because the mold 2 has relatively larger heat capacity and is cooled in the previous process, therefore the mold 2 is able to be more rapidly heated. The pressure in the pipe lines can be designed in such a manner that medium does not boil considering the overshoot in advance.

In place of the embodiment wherein the second heater 22 constituting heat exchange means of the high temperature medium supply portion 20A is forcibly operated until the predetermined conditions are satisfied, two-position control (ON/OFF control) can be executed based on the temperature detected by the second medium temperature sensor 24 until the predetermined conditions are satisfied as explained in the first embodiment. Compared with normal control such as PID control, high temperature medium is able to be more rapidly returned to the preset temperature. While the second medium supply/switch process is being executed, the second cooling valve V21 constituting the cooling means of the second medium supply portion 20A can be forcibly closed. Namely, temperature control based on the preset temperature can be disabled.

<Mold Heating Process: Second Medium Supply Process>

After the above-mentioned predetermined conditions are satisfied, normal control based on the temperature detected by the second medium temperature sensor 24 is executed such that high temperature medium reaches the preset temperature, and the second medium supply process is executed.

The valves are kept in the second medium supply mode, high temperature medium is circularly supplied in the medium flow path 3 of the mold 2, and the mold 2 is heated.

In the second medium supply process, by exchanging heat with the mold 2, the medium temperature on the inlet side of the mold 2 changes slightly around the preset temperature (145 degrees centigrade, for example) from the above-mentioned overshoot temperature.

As mentioned above, the second medium supply process, the third medium supply process, the first medium supply process, and the second medium supply/switch process are repeatedly executed in this order.

The mold temperature control device 1A of this embodiment of the present invention has substantially the same advantageous effects as those of the first embodiment as mentioned above. The set temperature of the third medium is set to be lower than that of the first medium in this operation example; they can be also the same.

The above-mentioned operation examples execute such control that after the third medium supply mode, at least the second medium remaining in the medium flow path 3 and the pipe lines 5, 6 connecting the medium flow path 3 and the valve unit 40 is replaced with the third medium, and then the mode is switched to the first medium supply mode. The mode can be controlled to be switched to the first medium supply mode without replacing the whole amount of the remaining second medium. In such a case, drop or rise range of the temperature in the first medium supply portion is able to be reduced and molding cycle is able to be shortened compared with the conventional device.

In the above-mentioned operation examples, after the first medium supply mode is switched to the second medium supply mode and the heat exchange means of the second medium supply portion is forcibly operated, the heat exchange means is operated under normal control. However, such forcible operation is not always required. In this case, temperature of medium (the first medium) is able to be more rapidly returned to the set temperature compared with the conventional ones, so that molding cycle is able to be shortened.

In the above-mentioned embodiments, the bypass paths 41, 42, 43 provided with the bypass valves V5, V6, V7, respectively, are incorporated in the valve unit 40; however, the bypass paths can be provided for the medium supply portions.

In the above-mentioned embodiments, the mold temperature control devices 1, 1A have the above-mentioned portions; however, the mold temperature device 1 (1A) can have the first medium supply device 10 (10A) constituting the first medium supply portion, the second medium supply device 20 (20A) constituting the second medium supply portion, the third medium supply device 30 (30A) constituting the third medium supply portion, the valve unit 40, and the control unit 50 having the CPU 51 and so on.

In the above-mentioned embodiments, the mold temperature control device has the first medium supply portion, the second medium supply portion and the third medium supply portion for circularly supplying the third medium corresponding to the first medium. In addition, a fourth medium supply portion circularly supplying a fourth medium corresponding to the second medium can be provided. In this case, switch valves are further provided and a forth medium supply process can be executed in the same manner as the third medium supply process in place of the second medium supply/switch process explained in the above operation examples. Namely, after the first medium supply mode circularly supplying first medium to the medium flow path 3 of the mold 2 is switched to the fourth medium supply mode circularly supplying fourth medium to the medium flow path 3, the mode can be switched to the second medium supply mode circularly supplying the second medium to the medium flow path 3. Furthermore, a plurality of the third medium supply portions and a plurality of the fourth medium supply portions can be provided.

In the above-mentioned embodiments, the medium supply portions have substantially the same configuration so as to be applicable to several operational conditions and so as not to complicate system configuration; however, the present invention is not limited to such embodiments. A specific medium supply portion can also be used as the high temperature medium supply portion for supplying high temperature medium and a specific medium supply portion can also be used as the low temperature medium supply portion for supplying low temperature medium. In addition, a similar specific preliminary medium supply portion can also be used as the third medium supply portion.

REFERENCE SIGNS LIST

1, 1A mold temperature control device
2 mold
3 medium flow path
10 high temperature medium supply portion (first medium supply portion)

10A low temperature medium supply portion (first medium supply portion)
15 first medium supply path
16 first medium return path
20 low temperature medium supply portion (second medium supply portion)
V21 second medium cooling valve (heat exchange means)
23 cooling pipe (heat exchange means)
20A high temperature medium supply portion (second medium supply portion)
22 second medium heater (heat exchange means)
24 second medium temperature sensor
25 second medium supply path
26 second medium return path
30 pre-high temperature medium supply portion (third medium supply portion)
30A pre-low temperature medium supply portion (third medium supply portion)
35 third medium supply path
36 third medium return path
40 valve unit (switching connection portion)
51 CPU (control portion)

The invention claimed is:

1. A mold temperature control device comprising:
a first medium supply portion for circularly supplying first medium to a medium flow path of a mold;
a second medium supply portion for circularly supplying said medium flow path with second medium having temperature different from that of said first medium;
a third medium supply portion for circularly supplying third medium corresponding to said first medium to said medium flow path;
a switching connection portion for switching between a medium supply path and a medium return path of each medium supply portion to connect said medium flow path; and
a control portion which switches second medium supply mode circularly supplying said second medium to said medium flow path to third medium supply mode circularly supplying said third medium to said medium flow path, and to first medium supply mode supplying said first medium to said medium flow path by controlling said switching connection portion, wherein
said switching connection portion is constituted as a valve unit provided adjacent to said mold, said switching connection portion including a plurality of valves for switching said medium supply path and said medium return path of each medium supply portion to said medium flow path, said valve unit having a bypass path connecting said medium supply path and said medium return path of each medium supply portion and circulating the medium of each medium supply portion, and said valve unit having a bypass valve for opening and closing each bypass path.

2. The mold temperature control device as set forth in claim 1, wherein said control portion replaces at least said second medium remaining in said medium flow path and in a pipe line connecting said medium flow path and said switching connection portion with said third medium in said third medium supply mode, then said control portion switches said third medium supply mode to said first medium supply mode.

3. The mold temperature control device as set forth in claim 1, wherein said control portion switches said first medium supply mode to said second medium supply mode and forcibly operates a heat exchange means of said second medium supply portion, then said control portion controls said heat exchange means based on temperature detected by a temperature sensor in such a manner that said second medium becomes preset temperature.

4. The mold temperature control device as set forth in any one of claims 1 to 3, wherein said first medium supply portion is a high temperature medium supply portion for circularly supplying high temperature medium, and said second medium supply portion is a low temperature medium supply portion for circularly supplying low temperature medium.

5. The mold temperature control device as set forth in claim 4, wherein set temperature of said third medium is higher than set temperature of said high temperature medium.

6. The mold temperature control device as set forth in any one of claims 1 to 3, wherein said first medium supply portion is a low temperature medium supply portion for circularly supplying low temperature medium, and said second medium supply portion is a high temperature medium supply portion for circularly supplying high temperature medium.

7. The mold temperature control device as set forth in claim 6, wherein set temperature of said third medium is lower than set temperature of said low temperature medium.

8. The mold temperature control device as set forth in claim 2, wherein said control portion switches said first medium supply mode to said second medium supply mode and forcibly operates a heat exchange means of said second medium supply portion, then said control portion controls said heat exchange means based on temperature detected by a temperature sensor in such a manner that said second medium becomes preset temperature.

9. The mold temperature control device as set forth in claim 8, wherein said first medium supply portion is a high temperature medium supply portion for circularly supplying high temperature medium, and said second medium supply portion is a low temperature medium supply portion for circularly supplying low temperature medium.

10. The mold temperature control device as set forth in claim 9, wherein set temperature of said third medium is higher than set temperature of said high temperature medium.

11. The mold temperature control device as set forth in claim 8, wherein said first medium supply portion is a low temperature medium supply portion for circularly supplying low temperature medium, and said second medium supply portion is a high temperature medium supply portion for circularly supplying high temperature medium.

12. The mold temperature control device as set forth in claim 11, wherein set temperature of said third medium is lower than set temperature of said low temperature medium.

* * * * *